(12) United States Patent
Ananthanarayanan et al.

(10) Patent No.: US 9,385,795 B1
(45) Date of Patent: Jul. 5, 2016

(54) FOUR-BY-FOUR DOWNLINK (4×4 DL) MULTIPLE-INPUT-MULTIPLE OUTPUT (MIMO) WITH EXISTING ANTENNA STRUCTURES

(71) Applicant: AMAZON TECHNOLOGIES, INC., Seattle, WA (US)

(72) Inventors: Peruvemba Ranganathan Sai Ananthanarayanan, Sunnyvale, CA (US); In Chul Hyun, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/612,080

(22) Filed: Feb. 2, 2015

(51) Int. Cl.
*H04B 7/04* (2006.01)
*H04B 7/06* (2006.01)
*H04B 7/08* (2006.01)
*H04L 5/08* (2006.01)

(52) U.S. Cl.
CPC ............... *H04B 7/046* (2013.01); *H04B 7/068* (2013.01); *H04B 7/0891* (2013.01); *H04L 5/08* (2013.01)

(58) Field of Classification Search
CPC .... H04B 1/401; H04B 7/0404; H04B 7/0413; H04B 7/0689; H04B 7/0691; H04B 7/0874; H04W 88/06
See application file for complete search history.

(56) References Cited

U.S. PATENT DOCUMENTS

| | | | |
|---|---|---|---|
| 2007/0066245 A1* | 3/2007 | Snider | 455/78 |
| 2008/0106476 A1* | 5/2008 | Tran | H01Q 1/22 343/702 |
| 2010/0238075 A1* | 9/2010 | Pourseyed | H01Q 21/28 343/702 |
| 2012/0329407 A1* | 12/2012 | Rousu | H01Q 3/2605 455/90.2 |
| 2013/0143494 A1* | 6/2013 | Chen | H04W 8/22 455/41.2 |
| 2013/0315117 A1* | 11/2013 | Le Naour | H04B 1/44 370/297 |
| 2014/0169243 A1* | 6/2014 | Khlat et al. | 370/297 |
| 2014/0349584 A1* | 11/2014 | Clevorn | H04B 7/0689 455/67.13 |
| 2015/0180530 A1* | 6/2015 | Florentinus de Maaijer | H04B 1/401 375/219 |
| 2015/0256213 A1* | 9/2015 | Jan | H04B 1/44 370/338 |

* cited by examiner

*Primary Examiner* — Curtis A Alia
(74) *Attorney, Agent, or Firm* — Lowenstein Sandler LLP

(57) ABSTRACT

Antenna structures and methods of operating the same of an electronic device are described. One apparatus includes an antenna structure comprising four antenna elements, a RF circuit, and a MIMO RF circuit coupled between the antenna structure and the RF circuit. The MIMO RF circuit may include a pair of diplexers; and a pair of switches. The RF circuit is operable to cause a first antenna element of the four antenna elements to radiate and receive electromagnetic energy in a first frequency range via the MIMO RF circuit and the RF circuit is operable to cause a remaining three antenna elements of the four antenna elements to receive electromagnetic energy in the first frequency range via the MIMO RF circuit to support 4×4 DL MIMO.

22 Claims, 8 Drawing Sheets

FOUR-BY-FOUR DOWNLINK (4×4 DL) MULTIPLE-INPUT-MULTIPLE OUTPUT (MIMO) WITH EXISTING ANTENNA STRUCTURES

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Antenna architectures with a four-by-four downlink (4×4 DL) multiple-input-multiple-output (MIMO) support using four antennas, and methods of operating the same, of an electronic device are described. One apparatus includes an antenna structure comprising four antenna elements, a RF circuit, and a MIMO RF circuit coupled between the antenna structure and the RF circuit. The MIMO RF circuit may include a pair of diplexers; and a pair of switches. The RF circuit is operable to cause a first antenna element of the four antenna elements to radiate and receive electromagnetic energy in a first frequency range via the MIMO RF circuit and the RF circuit is operable to cause a remaining three antenna elements of the four antenna elements to receive electromagnetic energy in the first frequency range via the MIMO RF circuit to support 4×4 DL MIMO.

In a constrained radiation space (low and thin profiles for mobile devices) of user devices, antenna engineers face various challenges. One challenge is that mobile devices require, or will require 4×4 DL MIMO capability. A conventional solution to providing 4×4 DL MIMO capability is to add additional antennas that can be tuned at a particular frequency for simultaneous operation. When using this conventional solution, there is an increase in form factor for good performance. As a result, cellular operates expect mobile devices to grow in physical size to accommodate more antennas to support 4×4 DL MIMO. These devices may also include antennas for cellular bands and the global positioning system (GPS) band, such as illustrated and described with respect to FIG. 1. The embodiments described herein achieve 4×4 DL MIMO capability with a current device form factor and antenna repository and also cover all required cellular bands and 2-component or 3-component carrier aggregation, such as illustrated and described with respect to FIGS. 2-8. The antenna structures described herein can be used for Long Term Evolution (LTE) frequency bands, third generation (3G) frequency bands, Wi-Fi® and Bluetooth® frequency bands or other wireless local area network (WLAN) frequency bands, wide area network (WAN) frequency bands, global navigation satellite system (GNSS) frequency bands (e.g., positioning system (GPS) frequency bands, or the like.

Figure 1:
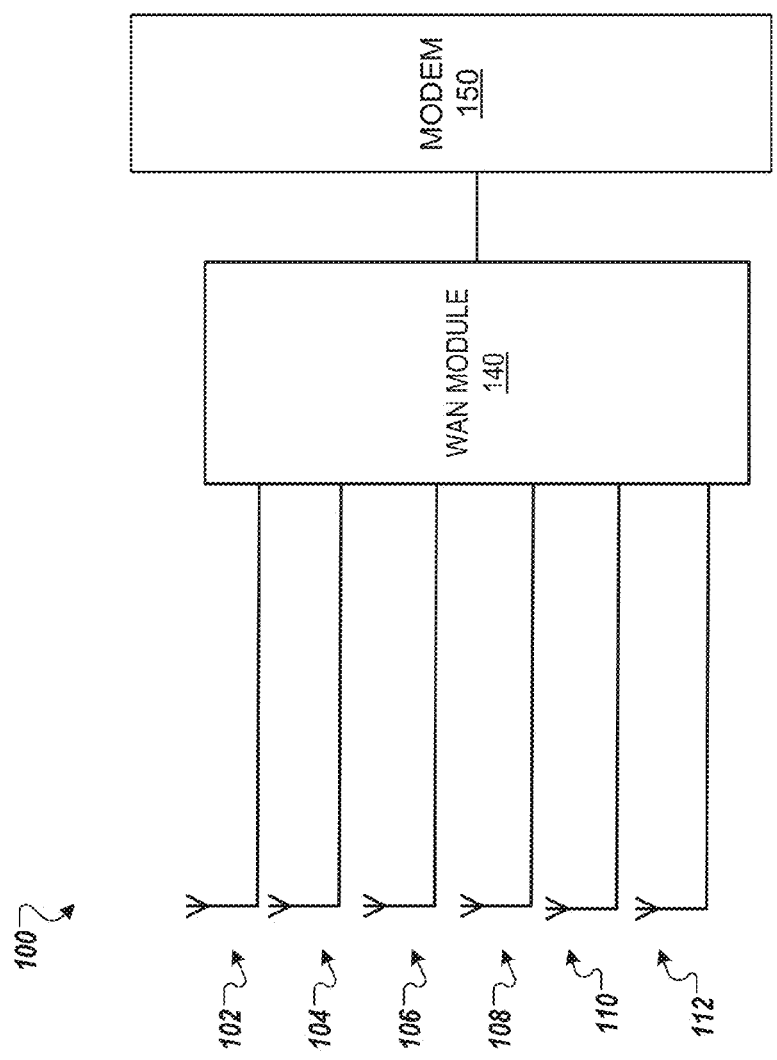
FIG. 1 is a block diagram of an antenna architecture of a user device with two additional antennas for 4×4 DL MIMO support according to one implementation.

FIG. 1 is a block diagram of an antenna architecture of a user device 100 with two additional antennas for 4×4 DL MIMO support according to one implementation. The user device 100 includes a first antenna (antenna 1) 102, a second antenna (antenna 2) 104, a third antenna (antenna 3) 106, a fourth antenna (antenna 4) 108, and two additional antennas 110, 112 to support 4×4 DL MIMO. Antenna 1 102 may be referred to as a primary LB/MB antenna and antenna 2 104 may be referred to as the primary HB antenna, and may be collectively referred to as a main wireless area network (WAN) antenna. Antenna 3 106 may be referred to as a secondary LB/MB antenna, and antenna 4 108 may be referred to as Secondary WAN, WLAN/PAN, and GPS/GNSS antenna. In order to support 4×4 DL MIMO support, the user device 100 also includes a fifth antenna 110 and a sixth antenna 112.

A diversity antenna is a secondary antenna that may be used along with the one or more primary antennas to improve the quality and reliability of a wireless link. There may be no clear line-of-sight between a transmitter and a receiver. Instead, a signal may undergo multiple reflections between transmission and reception. Each reflection may introduce time delays, phase shifts, distortions, attenuations, etc. that can degrade a signal quality. The diversity antennas have a different location and/or configuration than the primary antennas on the user device, and may therefore experience different phase shifts, time delays, attenuations, distortions, etc. Accordingly, signals at the diversity antenna can be compared to signals at the primary antenna to determine and mitigate such effects. The primary LB antenna and diversity LB antenna may have a length and configuration that are optimized for transmission and receipt of radio frequency (RF) signals in the range of about 650 Megahertz (MHz) to about 1000 MHz. A primary mid-band (MB) antenna and diversity MB antenna have a length and configuration that are optimized for transmission and receipt of RF signals in the range of about 1700 MHz to about 2200 MHz. A primary high-band (HB) antenna and diversity HB antenna have a length and configuration that are optimized for transmission and receipt of RF signals in the range of about 2300 MHz to about 2700 MHz. As described herein, the HB can be split into multiple frequency bands in different configuration. The user device 100 may include other antennas, such as a personal area network (PAN)/WLAN antenna having a length and size optimized for 2.4 GHz RF signals and 5 GHz RF signals (e.g., for Bluetooth®, dual-band Wi-Fi® networks, or the like). The user device 100 may include other antennas, such as GPS antenna having a length and size optimized for RF signals in the range of about 1400 MHz to about 1600 MHz. Numerous other antenna selections may be used in various user devices. For example, a user device may have fewer primary antennas and/or fewer diversity antennas as depicted in FIG. 1.

The user device 100 can cover various frequency bands using the four antennas, such as follows: frequency bands B17, B12, B13, B20, B5, B8, B26, B3, B2, B4, B1, B25 by Antenna 1 102; frequency bands B30/B7, B2, B1, B3 by Antenna 2 104; frequency bands B17, B12, B13, B20, B5, B8 in the low-band (LB) and B1, B2, B3, B4 in the mid-band (MB) by antenna 3 106; and GNSS frequency band (e.g., GPS bands), frequency bands B30, B7, and WLAN/PAN frequency bands by Antenna 4 108 (e.g., 2.4 GHz & 5 GHz dual-band Wi-Fi® bands for WLAN and Bluetooth® for PAN). Antenna 1 102 and antenna 2 104 can be used for primary TX/RX antennas and antenna 3 106 and antenna 4 108 can be used for secondary antennas, such as for diversity or MIMO, but these four antenna structures do not support 4×4 DL MIMO.

The first antenna 102, second antenna 104, third antenna 106, fourth antenna 108, fifth antenna 110 and sixth antenna 112 are coupled to a WAN module 140. The WAN module 140 may be a RF module for connecting to wireless base stations of a wireless carrier. The WAN module 140 may be an integrated circuit disposed on a PCB of the user device 100. The WAN module 140 may include one or more transmitters and/or transceivers, and may additionally include one or more primary receivers and/or secondary receivers.

The WAN module 140 is coupled to a modem 150. The modem 150 allows the user device 100 to handle both voice and non-voice communications (such as communications for text messages, multimedia messages, media downloads, web browsing, etc.) with a wireless communication system. The modem 150 may provide network connectivity using any type of digital mobile network technology including, for example, long term evolution (LTE) technologies, cellular digital packet data (CDPD), general packet radio service (GPRS), enhanced data rates for GSM evolution (EDGE), UMTS, 1 times radio transmission technology (1×RTT), evaluation data optimized (EVDO), high-speed downlink packet access (HSDPA), WLAN (e.g., Wi-Fi® network), etc.

As described above, when using this conventional solution as illustrated in FIG. 1, there is an increase in form factor for good performance. The embodiments described herein achieve 4×4 DL MIMO capability with a current device form factor and antenna repository and also cover all required cellular bands and 2-component or 3-component carrier aggregation, such as illustrated and described with respect to FIGS. 2-8.

Figure 2:
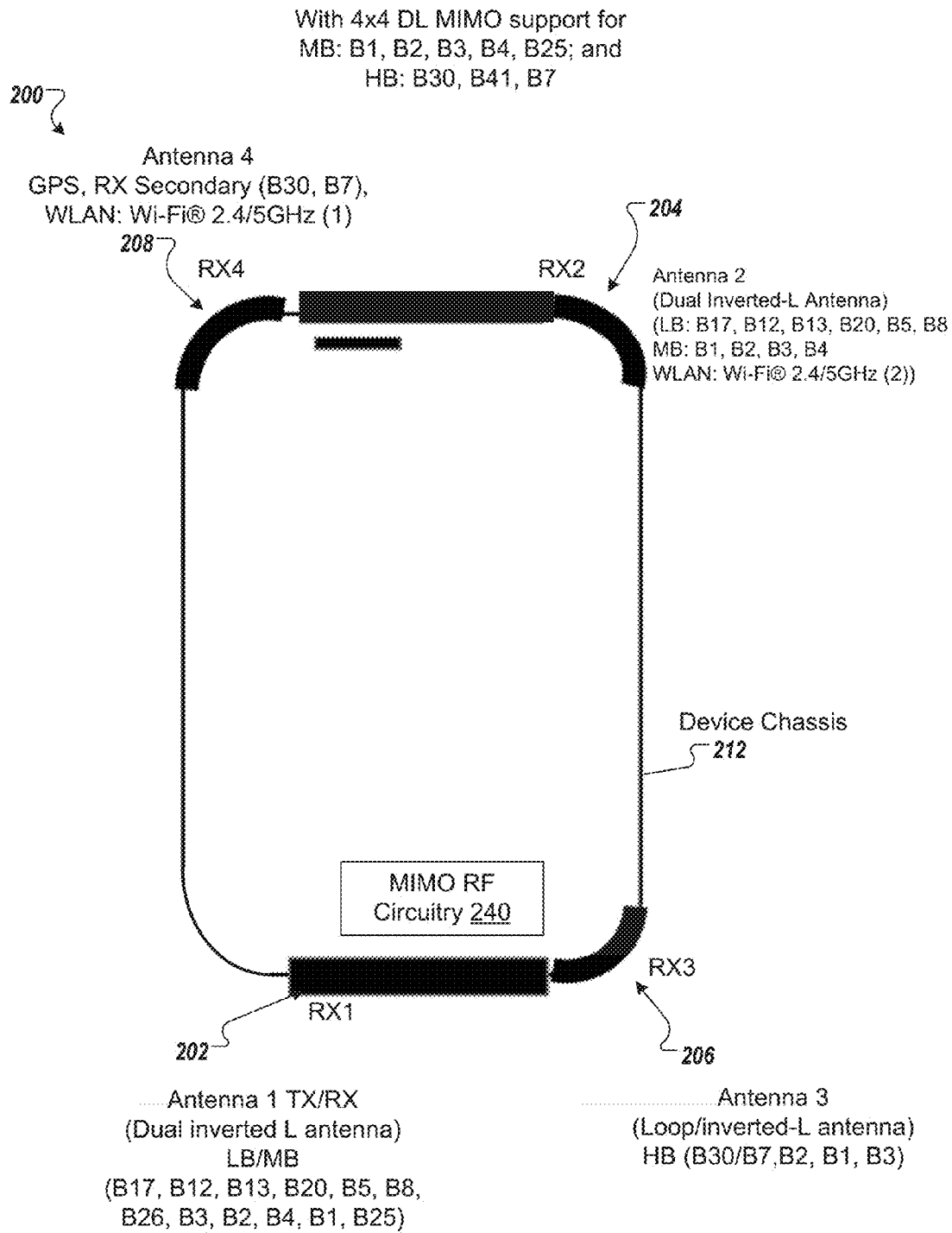
FIG. 2 is a rear view of a user device with four antenna structures with 4×4 DL MIMO support according to one embodiment.

FIG. 2 is a rear view of a user device 200 with four antenna structures with 4×4 DL MIMO support according to one embodiment. The user device 200 supports various air interface technologies, including WAN, WLAN, PAN, and GNSS technologies in a single user device design for different global markets. The WAN technologies supported may include 4G data over LTE with carrier aggregation of 3G data and voice, as well as 2G. The WAN antennas are used to cover multiple 4G and 3G bands.

The user device 200 (also referred to herein as an electronic device) may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, and the like. The user device may connect to a network to obtain content from a server computing system (e.g., an item providing system) or to perform other activities. The user device may connect to one or more different types of cellular networks.

The user device 200 includes a first antenna (antenna 1) 202, a second antenna (antenna 2) 204, a third antenna (antenna 3) 206, and a fourth antenna (antenna 4) 208. Antenna 1 202 may be referred to as a primary LB/MB antenna and antenna 3 206 may be referred to as the primary HB antenna, and may be collectively referred to as a main WAN antenna. Antenna 2 204 may be referred to as a secondary LB/MB and WLAN/PAN antenna, and antenna 4 208 may be referred to as Secondary WAN, WLAN/PAN, and GPS/GNSS antenna. The user device 200 may include the same or similar antenna structures as described above with respect to user device 100 of FIG. 1, however, the user device 200 supports 4×4 DL MIMO without the additional antennas 110, 112. In particular, antenna 1 202 is used as the primary transmit and receive (TX/RX1) antenna, antenna 2 is used as the second receive (RX2) antenna, antenna 3 is used for the third receive (RX3) and antenna 4 is used for the fourth receive (RX4). Alternatively, different RX designations may be used for the different antennas 202-208. As described above, a diversity antenna, or a MIMO antenna, is a secondary antenna that may be used along with the one or more primary antennas to improve the quality and reliability of a wireless link. There may be no clear line-of-sight between a transmitter and a receiver. Instead, a signal may undergo multiple reflections between transmission and reception. Each reflection may introduce time delays, phase shifts, distortions, attenuations, etc. that can degrade a signal quality. The diversity antennas have a different location and/or configuration than the primary antennas on the user device, and may therefore experience different phase shifts, time delays, attenuations, distortions, etc. Accordingly, signals at the diversity antenna can be compared to signals at the primary antenna to determine and mitigate such effects. The primary LB antenna and diversity LB antenna may have a length and configuration that are optimized for transmission and receipt of radio frequency (RF) signals in the range of about 650 Megahertz (MHz) to about 1000 MHz. A primary mid-band (MB) antenna and diversity MB antenna have a length and configuration that are optimized for transmission and receipt of RF signals in the range of about 1700 MHz to about 2200 MHz. A primary high-band (HB) antenna and diversity HB antenna have a length and configuration that are optimized for transmission and receipt of RF signals in the range of about 2300 MHz to about 2700 MHz. As described herein, the HB can be split into multiple frequency bands in different configuration. The antennas 202-208 can also be used for other frequency bands, such as the antenna 4 208 operating as a WLAN antenna. For example, the PAN/WLAN antenna may be sized or an impedance matching network can be used to optimize the antenna 4 for 2.4 GHz RF signals and 5 GHz RF signals (e.g., for Bluetooth®, dual-band Wi-Fi® networks, or the like). For another example, the antenna 4 208 may operate as an GPS antenna, having a length and size and/or have an impedance matching network, optimized for RF signals in the range of about 1400 MHz to about 1600 MHz. Numerous other antenna selections may be used in various user devices. For example, a user device may have more primary antennas and/or more diversity antennas as depicted in FIG. 2.

The user device 200 can cover various frequency bands using the four antennas, such as follows: frequency bands B17, B12, B13, B20, B5, B8, B26, B3, B2, B4, B1, B25 by Antenna 1 202; frequency bands B30/B7, B2, B1, B3 by Antenna 3 206; frequency bands B17, B12, B13, B20, B5, B8 in the low-band (LB) and B1, B2, B3, B4 in the mid-band (MB) and WLAN bands (e.g. 2.4 GHz & 5 GHz dual-band Wi-Fi® bands for WLAN and Bluetooth® for PAN) by antenna 2 204; and GNSS frequency band (e.g., GPS bands), frequency bands B30, B7, and WLAN/PAN frequency bands by Antenna 4 108 (e.g., 2.4 GHz & 5 GHz dual-band Wi-Fi® bands for WLAN and Bluetooth® for PAN). Antenna 2 204 may also be used for other frequency bands, such as FRS spectrum. Antenna 1 202 can be used for the primary TX/RX1 antenna and antenna 2 204, antenna 3 206 and antenna 4 208 can be used for secondary antennas (RX2. RX3, RX4) to support 4×4 DL MIMO.

Antenna 1 202 and antenna 2 204 may be dual inverted-L antennas and antenna 3 206 and antenna 4 208 may be loop antennas or inverted-L antennas. Alternatively, the antennas may be different types of antennas, including folded monopole antennas, inverted-F antennas, or the like. In another embodiment, the antennas described herein may be disposed on, within, or in connection with a circuit board, such as a PCB. Additional antennas, such as a NFC antenna (not illustrated in FIG. 2) located at a rear side of the user device, such as under a plastic insert within an opening in a device chassis 212. The user device 200 may also include a RFID tag (not illustrated).

For purposes of description, when antenna locations are discussed, it is with respect to looking at the user device 200 from a back side (an opposite side of a display on a front side) with a top edge of the user device 200 pointing upwards to the sky. The primary TX/RX antenna element (e.g., first antenna 202), also sometimes referred to as the main antenna, is located at a bottom side of a device chassis 212 of the user device 200, while the secondary RX antenna elements (e.g., second antenna 204, third antenna 206 and fourth antenna 208) are located at the bottom side and a top side of the device chassis 212 of the user device 200. In other embodiments, other types of antennas may be used, such as monopole antennas, loop antennas, patch antennas, inverted F antennas, planar inverted F antennas, and so forth. It should be noted that the user device 200 may include a back cover of various types of materials. For example, the back cover may be all metal with a separate from the top (e.g., 2 mm separation). The back cover may also be plastic, leather, or other non-conductive materials. Although not illustrated in FIG. 2, when the back cover is metal, the back cover can cover the user device up to a bottom portion where the antennas 202, 206 are located and up to a top portion where the antennas 204, 208 are located. In other embodiments, the rear cover may cover the entire back side of the user device when other non-conductive materials are used. In other embodiments, other housing structures (e.g., rear housing) may be used to accommodate the antennas 202, 204, 206, and 208 as described herein.

The primary or main antenna may be made up of two elements, a LB/MB element (Antenna 1 202) located at a bottom edge of a bottom side of the device chassis 212, and a HB element (Antenna 3 206) located at a second corner of the bottom side of the device chassis 212. The HB element (Antenna 3 206) may also be used as the third RX antenna (RX3) for 4×4 DL MIMO support. A single feed can be used to feed both antenna elements. Alternatively, the primary antenna may be split into two separate antenna elements with separate RF feeds to facilitate impedance matching for the two antenna elements. Splitting the primary antenna into two separate elements with separate RF feeds allows a better match to be obtained since the impedance matching circuit only has to operate at a single band (low or high). The first antenna 202 can operate at LB/MB frequencies with one or more impedance matching network coupled to one RF feed, and the third antenna 206 can operate HB frequencies with another impedance matching network coupled to another RF feed.

The secondary antenna may be made up of three elements, a high-band element (Antenna 4 208) located at a third corner of the top side of the device chassis 212, and a LB/MB element (Antenna 2 204) located at a fourth corner of the top side of the device chassis 212, and, as described above, a HB element (Antenna 3 206) located at a second corner of the bottom side of the device chassis 212. The high-band element (Antenna 4 208) may operate as the secondary high-band RX antenna element, as well as a WLAN/PAN antenna (Antenna 4 208) (e.g., Bluetooth®/Wi-Fi®/5 GHz frequency bands), a GPS antenna (or other GNSS frequency bands), or a combined WLAN/GPS antenna. The LB/MB element (antenna 2 204) may operates as a secondary LB/MB antenna element, as well as a secondary WLAN/PAN antenna (e.g., Bluetooth®/Wi-Fi®/5 GHz frequency bands).

In one embodiment, the user device 200 includes an antenna structure including four antenna elements, a RF circuit, and a MIMO RF circuit 240 coupled between the antenna structure and the RF circuit. The MIMO RF circuit 240 includes a pair of diplexers; and a pair of switches. The RF circuit is operable to cause a first antenna element of the four antenna elements to radiate and receive electromagnetic energy in a first frequency range via the MIMO RF circuit and the RF circuit is operable to cause a remaining three antenna elements of the four antenna elements to receive electromagnetic energy in the first frequency range via the MIMO RF circuit to support 4×4 DL MIMO. In a further embodiment, the MIMO RF circuit 240 includes the antenna architecture 300 illustrated and described below with respect to FIG. 3. In another embodiment, the MIMO RF circuit 240 includes the antenna architecture 400 illustrated and described below with respect to FIG. 4.

For example, in one embodiment, a first diplexer of the pair of diplexers is coupled to the first antenna element, a first conductive path and a second conductive path and the first conductive path is coupled to the RF circuit. A first switch of the pair of switches is coupled to the second conductive path, a third conductive path and a fourth conductive path, and the third conductive path and the fourth conductive path are coupled to the RF circuit. A second diplexer of the pair of diplexers is coupled to a second antenna element of the four antenna elements, a fifth conductive path and a sixth conductive path, and the fifth conductive path is coupled to the RF circuit. A second switch of the pair of switches is coupled to the sixth conductive path, a seventh conductive path and an eighth conductive path, and the seventh conductive path and the eighth conductive path are coupled to the RF circuit. A ninth conductive path is coupled between a third antenna element of the four antenna elements and the RF circuit and a tenth conductive path is coupled between a fourth antenna element of the four antenna elements and the RF circuit.

In a further embodiment, the RF circuit is operable to cause the first antenna element to radiate and receive electromagnetic energy in at least one of the first frequency range, a second frequency range, or a third frequency range, the first antenna element operating as a first receive antenna of the 4×4 DL MIMO in the third frequency range. The RF circuit is also operable to cause the second antenna element to receive electromagnetic energy in at least one of the first frequency range, the second frequency range, or the third frequency range, the second antenna element operating as a second receive antenna of the 4×4 DL MIMO in the third frequency range. The RF circuit is also operable to cause the third antenna element to receive electromagnetic energy as a third receive antenna of the 4×4 DL MIMO in the third frequency range. The RF circuit is also operable to cause the fourth antenna element to receive electromagnetic energy as a fourth receive antenna of the 4×4 DL MIMO in the third frequency range. In one embodiment, the third frequency range is between approximately 2300 MHz to 2690 MHz.

In another embodiment, the MIMO RF circuit 240 includes a first diplexer of the pair of diplexers, the first diplexer being coupled to the first antenna element, a first conductive path and a second conductive path, and the first conductive path and the second conductive path are coupled to the RF circuit. A second diplexer of the pair of diplexers is coupled to a second antenna element of the four antenna elements, a third conductive path and a fourth conductive path, and the third conductive path and the fourth conductive path are coupled to the RF circuit. A first switch of the pair of switches is coupled to a third antenna element of the four antenna elements, a fifth conductive path and a sixth conductive path, wherein the fifth conductive path and the sixth conductive path are coupled to the RF circuit. A second switch of the pair of switches is coupled to a fourth antenna element of the four antenna elements, a seventh conductive path and an eight conductive path, and the seventh conductive path and the eighth conductive path are coupled to the RF circuit. The second conductive path, a third conductive path and a fourth conductive path, and the third conductive path and the fourth conductive path are coupled to the RF circuit. The second diplexer of the pair of diplexers is coupled to a second antenna element of the four antenna elements, a fifth conductive path and a sixth conductive path, and the fifth conductive path is coupled to the RF circuit. The second switch of the pair of switches is coupled to the sixth conductive path, a seventh conductive path and an eighth conductive path, and the seventh conductive path and the eighth conductive path are coupled to the RF circuit. A ninth conductive path is coupled between a third antenna element of the four antenna elements and the RF circuit. A tenth conductive path is coupled between a fourth antenna element of the four antenna elements and the RF circuit.

In a further embodiment, the RF circuit is operable to cause the first antenna element to radiate and receive electromagnetic energy in at least one of the first frequency range or a second frequency range, the first antenna element operating as a first receive antenna of the 4×4 DL MIMO in the second frequency range. The RF circuit is operable to cause the second antenna element to receive electromagnetic energy in at least one of the first frequency range or the second frequency range, the second antenna element operating as a second receive antenna of the 4×4 DL MIMO in the second frequency range. The RF circuit is operable to cause the third antenna element to receive electromagnetic energy as a third receive antenna of the 4×4 DL MIMO in the second frequency range. The RF circuit is operable to cause the fourth antenna element to receive electromagnetic energy as a fourth receive antenna of the 4×4 DL MIMO in the second frequency range. In one embodiment, the second frequency range is between approximately 1700 MHz to 2170 MHz.

Figure 3:
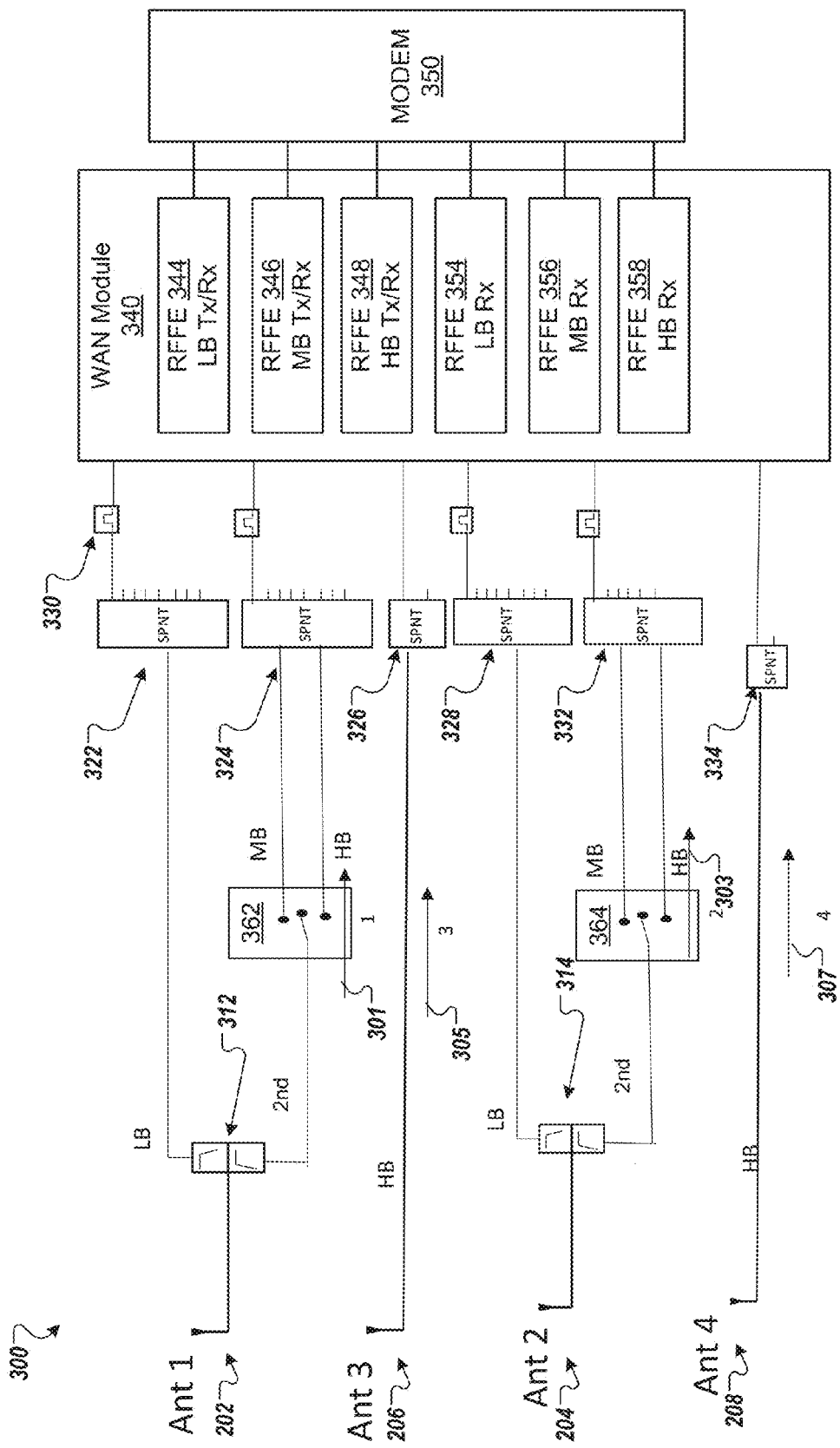
FIG. 3 is a block diagram of an antenna architecture of the user device of FIG. 2 with 4×4 DL MIMO support in a high-band according to one embodiment.

FIG. 3 is a block diagram of an antenna architecture 300 of the user device 200 of FIG. 2 with 4×4 DL MIMO support in a high-band (HB) according to one embodiment. Antenna architecture 300 includes four antennas 202, 204, 206 and 208 as described above with respect to FIG. 2. The first antenna 202 is coupled to a first diplexer 312, which is coupled to switches 322 and 362. The switch 362 is coupled to another switch 324 to create a HB path and a MB path, where a LB path is between the first diplexer 312 and switch 322. The switches 322 and 324 are coupled to a WAN module 340. The third antenna 206 is coupled to switch 326, which is coupled to the WAN module 340. The second antenna 204 is coupled to a second diplexer 314, which is coupled to switches 328 and 364. The switch 364 is coupled to another switch 232 to create a HB path and a MB path, where a LB path is between the second diplexer 314 and the switch 328. The switches 328 and 232 are coupled to the WAN module 240. The fourth antenna 208 is coupled to switch 234, which is coupled to the WAN module 340. The WAN module 340 is coupled to a modem 350. The switches 322-234 and 362-364 may be RF switches to route high frequency signals through transmission paths between the antennas 202-208 and the WAN module 340. The switches 322-234 may be single-pole-multiple-throw (SPnT) switches, where n represents the number of paths to the WAN module 340. Each of the paths may include a band pass filter 230 to pass a particular frequency range used by the WAN module 340. The switches 362, 364 may be single-pole-double-throw (SPDT) switches. Alternatively, the switches 362, 364 may be single-pole-multiple-throw (SPnT) switches.

The WAN module 340 may be a RF module for connecting to wireless base stations of a wireless carrier. The WAN module 340 may be an integrated circuit disposed on a PCB of the user device 200. The WAN module 340 may be configured to transmit and receive data using one or more WAN protocols, such as CDPD, GPRS, EDGE, UMTS, 1×RTT, EVDP, HSDPA, LTE, LTE advanced (4G), etc. The WAN module 340 may include one or more transmitters and/or transceivers, and may additionally include one or more primary receivers and/or secondary receivers. For example, a first transceiver may transmit and receive signals tuned to a first band (e.g., approximately 690 MHz~960 MHz in one embodiment) and a second transceiver may transmit and receive signals tuned to a second band (e.g., approximately 1700 MHz~2170 MHz in one embodiment). A WAN primary transceiver and secondary RF receiver may allow the user device to receive data using radio waves in the WAN bands via one or more antennas. In particular, the WAN secondary RF receivers may be coupled to one or more receive channels for WAN HB, WAN MB and/or WAN LB.

In the depicted embodiment, the WAN module 340 include RF circuitry configured to communicate data to one or more other devices using transmissions complying with specific communication protocols. Additionally, each RF module may be configured to radiate or receive electromagnetic energy (e.g., RF signals) in different frequency bands. Some RF modules may include multiple transceivers, transmitters and/or receivers, and supports 4×4 DL MIMO functionality. In other embodiments, the antenna architecture may include additional RF modules and/or other communication modules, such as a wireless local area network (WLAN) module, a GPS receiver, a near field communication (NFC) module, a Zigbee® module, an amplitude modulation (AM) radio receiver, a frequency modulation (FM) radio receiver, a personal area network (PAN) module (e.g., a Bluetooth® module), a Global Navigation Satellite System (GNSS) receiver, or the like.

The WAN module 340 may include one or multiple RFFE (also referred to as RF circuitry). The RFFEs may include receivers and/or transceivers, filters, amplifiers, mixers, switches, and/or other electrical components. One example of an RF front end is described with reference to FIG. 7. In the depicted embodiment, the WAN module 340 includes RFFE circuitry 344 for transmission and receive (Tx/Rx) in LB, RFFE circuitry 346 for Tx/Rx in MB, and RFFE circuitry 348 for Tx/Rx in HB.

In another embodiment, a WLAN module may be used for WLAN communications. For example, the WLAN module may include a WLAN RF transceiver for communications on one or more Wi-Fi® bands (e.g., 2.4 GHz and 5 GHz). It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel.

The modem 350 allows the user device 200 to handle both voice and non-voice communications (such as communications for text messages, multimedia messages, media downloads, web browsing, etc.) with a wireless communication system. The modem 350 may provide network connectivity using any type of digital mobile network technology including, for example, LTE, LTE advanced (4G), CDPD, GPRS, EDGE, UMTS, 1xRTT, EVDO, HSDPA, WLAN (e.g., Wi-Fi® network), etc. In the depicted embodiment, the modem 350 can use the RFFE circuitry 344, 346, 348, 354, 356, 358 to radiate or receive electromagnetic energy on the antennas to communication data to and from the user device 200 in the respective frequency ranges. In other embodiments, the modem 350 may communicate according to different communication types (e.g., WCDMA, GSM, LTE, CDMA, WiMAX, etc.) in different cellular networks.

The WAN module 340 may support two or three-component carrier aggregation. For a first component carrier, the first antenna 202 is coupled to the WAN module 340 via a LB path of the first diplexer 312 and switch 322 to radiate or receive electromagnetic energy in a low-band (LB) frequency range (e.g., 690 MHz to 960 MHz). For a second component carrier, the first antenna 202 is coupled to the WAN module 340 via a second path of the first diplexer 312 and when the switch 362 is connected to the MB path coupled between the switch 362 and the switch 324 to radiate or receive electromagnetic energy in a mid-band (MB) frequency range (e.g., 1700 MHz to 2170 MHz). For a third component carrier, a first antenna 202 is coupled to the WAN module 340 via the second path of the first diplexer 312 and when the switch 362 is connected to the HB path coupled between the switch 362 and the switch 324 to radiate or receive electromagnetic energy in a high-band (HB) frequency range (e.g., 2300 MHz to 2690 MHz) (TX/RX1 301). For 4×4 DL MIMO support, the third antenna 206 is coupled to the WAN module 340 via a HB path to receive electromagnetic energy in the HB frequency range (e.g., 2300 MHz to 2690 MHz) (RX3 305), the second antenna 204 is coupled to the WAN module 340 via the second diplexer 314 and switch 364 via a HB path between the switch 364 and switch 232 to receive electromagnetic energy in the HB frequency range (e.g., 2300 MHz to 2690 MHz) (RX2 303), and the fourth antenna 408 is coupled to the WAN module 340 via a HB path to receive electromagnetic energy in the HB frequency range (e.g., 2300 MHz to 2690 MHz) (RX4 307). The WAN module 340 permits concurrent or simultaneous communications within these frequency ranges. Instead of including additional antennas and additional RFFE to provide 4×4 DL MIMO support, the depicted embodiment uses the same antenna structures for 4×4 DL MIMO support. The depicted embodiment shows 4×4 DL MIMO support in the HB. In another embodiment, illustrated in FIG. 6, 4×4 DL MIMO support can be achieved in the MB.

In one embodiment, the electronic device includes the WAN module 340 on a PCB and the WAN module 340 is coupled to the four antennas 202-208 via MIMO RF circuitry. The MIMO RF circuitry includes the first diplexer 312, first switch 362, second diplexer 314, and second switch 364. The first diplexer 312 includes first, second and third terminals, the first terminal of the first diplexer being coupled to the first antenna 202. The first switch 362 includes first, second and third terminals, the first terminal of the first switch 362 being coupled to the third terminal of the first diplexer 312. The second diplexer 314 includes first, second and third terminals, the first terminal of the second diplexer being coupled to the second antenna 204. The second switch 364 includes first, second and third terminals, the first terminal of the second switch 364 being coupled to the third terminal of the second diplexer 314. The WAN module 340 is operable to cause the first antenna 202 to radiate or receive electromagnetic energy in a first frequency range via a first path through the second terminal of the first diplexer 312. The WAN module 340 is operable to cause the first antenna 202 to radiate or receive electromagnetic energy in a second frequency range via a second path through the second terminal of the first switch 362 and the third terminal of the first diplexer 312. The WAN module 340 is operable to cause the first antenna 202 to radiate or receive electromagnetic energy in a third frequency range via a third path through the third terminal of the first switch 362 and the third terminal of the first diplexer 312. The WAN module 340 is operable to cause the second antenna 204 to receive electromagnetic energy in the first frequency range via a fourth path through the second terminal of the second diplexer 314. The WAN module 340 is operable to cause the second antenna 204 to receive electromagnetic energy in the second frequency range via a fifth path through the second terminal of the second switch 364 and the third terminal of the second diplexer 314. The WAN module 340 is operable to cause the second antenna 204 to receive electromagnetic energy in the third frequency range via a sixth path through the third terminal of the second switch 364 and the third terminal of the second diplexer 314. The WAN module 340 is operable to cause the third antenna 206 to receive electromagnetic energy in the second frequency range via a seventh path between the third antenna and the WAN module 340. The WAN module 340 is operable to cause the fourth antenna 208 to receive electromagnetic energy in the second frequency range via an eighth path between the fourth antenna and the WAN module 340. In one embodiment, the first frequency range is between approximately 690 MHz to approximately 960 MHz, the second frequency range is between approximately 1700 MHz to 2170 MHz, and the third frequency range is between approximately 2300 MHz to 2690 MHz. Alternatively, other frequency ranges may be achieved.

In a further embodiment, the MIMO RF circuitry further includes the first SPnT switch 322 coupled between the second terminal of the first diplexer 312 and the WAN module 340, the second SPnT switch 324 coupled to the second terminal and the third terminal of the first switch 362, the first terminal of the first switch 362 being coupled to the third terminal of the first diplexer. The MIMO RF circuitry further includes the third SPnT switch 328 coupled between the second terminal of the second diplexer 314 and the WAN module 340, the fourth SPnT switch 232 coupled to the second terminal and the third terminal of the second switch 364, the first terminal of the second switch 364 being coupled to the third terminal of the second diplexer 314. The MIMO RF circuitry further includes the fifth SPnT switch 362 coupled between the third antenna 206 and the WAN module 340, and the sixth SPnT switch 234 coupled between the fourth antenna 408 and the WAN module 340.

As described above, a band pass filter can be used on each path between the SPnTs and the WAN module 340. For example, a first set of band pass filters is coupled to outputs of the second SPnT 324, a second set of band pass filters is coupled to output of the fourth SPnT 232, a third set of band pass filters is coupled to outputs of the fifth SPnT 326, and a fourth set of band pass filters is coupled to outputs of the sixth SPnT 234.

Figure 4:
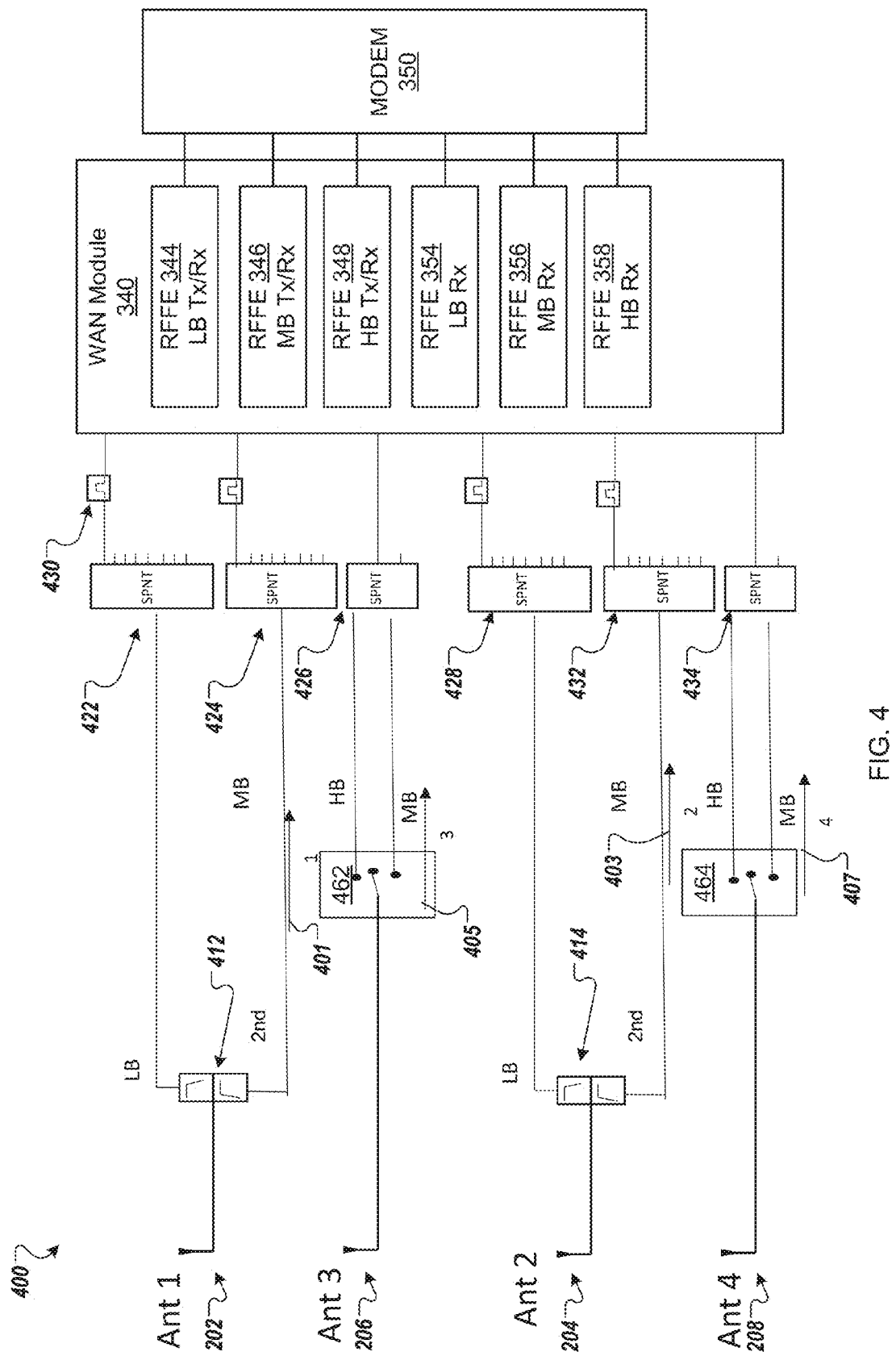
FIG. 4 is a block diagram of an antenna architecture of the user device of FIG. 2 with 4×4 DL MIMO support in a mid-band according to another embodiment.

FIG. 4 is a block diagram of an antenna architecture 400 of the user device of FIG. 2 with 4×4 DL MIMO support in a mid-band (MB) according to another embodiment. The antenna architecture 400 is similar to the antenna architecture 300 as noted by similar reference numbers, except the antenna architecture 400 includes switches 462 and 464, instead of switches 362 and 364.

The WAN module 340 may support two or three-component carrier aggregation. For a first component carrier, the first antenna 202 is coupled to the WAN module 340 via a LB path of the first diplexer 412 and switch 422 to radiate or receive electromagnetic energy in a low-band (LB) frequency range (e.g., 690 MHz to 960 MHz). For a second component carrier, the first antenna 202 is coupled to the WAN module 340 via a second path of the first diplexer 412 and the switch 424 to radiate or receive electromagnetic energy in a mid-band (MB) frequency range (e.g., 1700 MHz to 2170 MHz) (TX/RX1 401). For a third component carrier, the third antenna 206 is coupled to the WAN module 340 when the switch 462 is connected to a HB path coupled between the switch 462 and the WAN module 340 to radiate or receive electromagnetic energy in a high-band (HB) frequency range (e.g., 2300 MHz to 2690 MHz). However, for 4×4 DL MIMO support, the third antenna 206 is coupled to the WAN module 340 when the switch 462 is connected to a MB path coupled between the switch 462 and the WAN module 340 to receive electromagnetic energy in the MB frequency range (e.g., 1700 MHz to 2170 MHz) (RX3 405). The second antenna 204 is coupled to the WAN module 340 via a LB path of the second diplexer 414 and switch 428 to receive electromagnetic energy in a low-band (LB) frequency range (e.g., 690 MHz to 960 MHz). The second antenna 204 is also coupled to the WAN module 340 via a second path of the second diplexer 414 and switch 432 to receive electromagnetic energy in a mid-band (MB) frequency range (e.g., 1700 MHz to 2170 MHz) (RX2 403). The fourth antenna 208 is coupled to the WAN module 340 when the switch 464 is connected to a MB path coupled between the switch 464 and the WAN module 340 to receive electromagnetic energy in a mid-band (MB) frequency range (e.g., 1700 MHz to 2170 MHz) (RX4 407). The fourth antenna 208 may also be coupled to the WAN module 340 when the switch 464 is connected to a HB path coupled between the switch 464 and the WAN module 340 to receive electromagnetic energy in a high-band (HB) frequency range (e.g., 2300 MHz to 2690 MHz). Alternatively, the antenna 4 208 can be used for GPS, WLAN, or PAN frequency ranges.

It should be noted that impedance matching networks may be used in the various paths between the antenna 202-208 and the WAN module 340, as well as between the antenna 202-208 and other RF modules, such as a WLAN module, a PAN module, or an FRS module. The impedance matching networks operate to match an impedance of a respective antenna to an impedance of a RF circuit coupled to the respective antenna to radiate or receive electromagnetic energy in a specified frequency range.

In another embodiment, the MIMO RF circuitry includes the first diplexer 412, first switch 462, second diplexer 414, and second switch 464. The first diplexer 412 includes first, second and third terminals, the first terminal of the first diplexer 412 being coupled to the first antenna 202. The second diplexer 414 includes first, second and third terminals, the first terminal of the second diplexer 414 being coupled to the second antenna 204. The first switch 462 includes first, second and third terminals, the first terminal of the first switch 462 being coupled to the third antenna 206 and the second terminal and the third terminal of the first switch 462 being coupled to the WAN module 340. The second switch 664 includes first, second and third terminals, the first terminal of the second switch 464 being coupled to the fourth antenna 208 and the second terminal and the third terminal of the second switch 464 being coupled to the WAN module 340. The WAN module 340 is operable to cause the first antenna 202 to radiate or receive electromagnetic energy in a first frequency range via a first path through the second terminal of the first diplexer 412. The WAN module 340 is operable to cause the first antenna 202 to radiate or receive electromagnetic energy in a second frequency range via a second path through the third terminal of the first diplexer 412. The WAN module 340 is operable to cause the second antenna 204 to receive electromagnetic energy in the first frequency range via a third path through the second terminal of the second diplexer 414. The WAN module 340 is operable to cause the second antenna 204 to receive electromagnetic energy in the second frequency range via a fourth path through the third terminal of the second diplexer 414. The WAN module 340 is operable to cause the third antenna to receive electromagnetic energy in the second frequency range via a fifth path through the second terminal of the first switch 462. The WAN module 340 is operable to cause the fourth antenna 208 to receive electromagnetic energy in the second frequency range via a sixth path through the second terminal of the second switch 464. In one embodiment, the first frequency range is between approximately 690 MHz to approximately 960 MHz, the second frequency range is between approximately 1700 MHz to 2170 MHz, and the third frequency range is between approximately 2300 MHz to 2690 MHz. Alternatively, other frequency ranges may be achieved.

In another embodiment, the WAN module 340 is further operable to cause the third antenna to receive electromagnetic energy in the third frequency range via a seventh path through the third terminal of the first switch 462. The WAN module 340 is operable to cause the fourth antenna 208 to receive electromagnetic energy in the second frequency range via an eighth path through the third terminal of the second switch 464.

In another embodiment, the MIMO RF circuitry further includes a first SPnT switch 422 coupled between the second terminal of the first diplexer 412 and the WAN module 340. A second SPnT switch 424 is coupled between the third terminal of the first diplexer 412 and the WAN module 340. A third SPnT switch 426 is coupled between the second terminal and the third terminal of the first switch 462 and the WAN module 340. A fourth SPnT switch 428 is coupled between the second terminal of the second diplexer 414 and the WAN module 340. A fifth SPnT switch 432 is coupled between the third terminal of the second diplexer 414 and the WAN module 340. A sixth SPnT switch 434 is coupled between the second terminal and the third terminal of the second switch 464 and the WAN module 340.

As described above, a band pass filter can be used on each path between the SPnTs and the WAN module 340. For example, a first set of band pass filters is coupled to outputs of the second SPnT 424, a second set of band pass filters is coupled to output of the third SPnT 426, a third set of band pass filters is coupled to outputs of the fifth SPnT 432, and a fourth set of band pass filters is coupled to outputs of the sixth SPnT 434.

Figure 5:
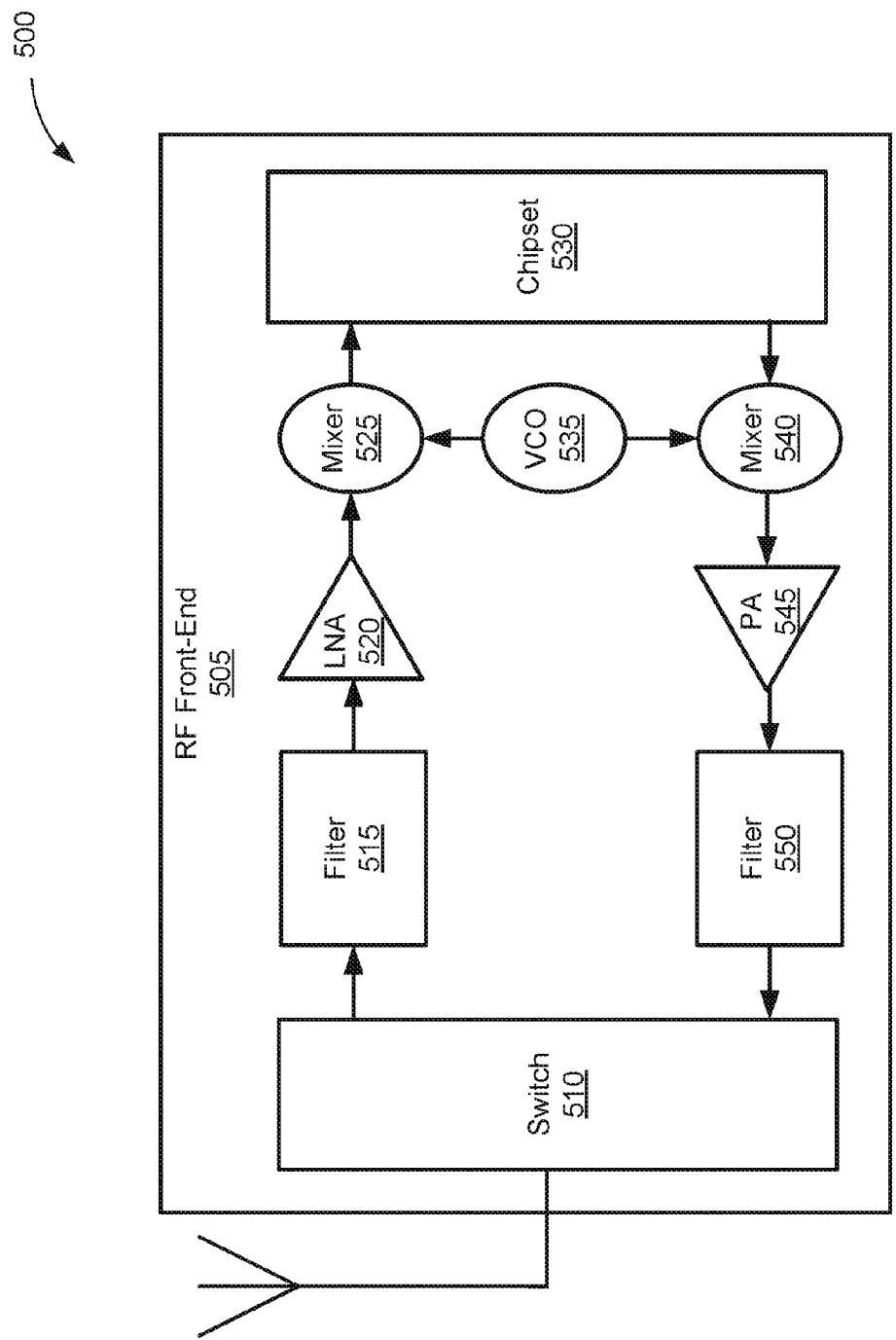
FIG. 5 is a block diagram of RF front-end circuitry for a RF module according to one embodiment.

FIG. 5 is a block diagram of RF front-end circuitry 505 for a RF module according to one embodiment. In one embodiment, the RF front-end circuitry 505 includes a switch 510 to switch between a send and a receive path. The RF front-end circuitry 505 additionally includes a filter 515 on the receive path and a filter 550 on the send path. The filters 515, 550 may be band pass filters (BPF) to pass a particular frequency range used by chipset 530. For example, if chipset 530 is a WAN transceiver, then filters 515 may be 2.0 GHZ band pass filters. Chipset 530 may be, for example, a FRS transceiver chipset, a WAN transceiver chipset, a WAN receiver chipset, a GPS receiver chipset, and so forth. After the filter 515 on the receiver path is a low noise amplifier (LNA) 520 to amplify the filtered signal. LNA 520 is followed by a mixer 525, which mixes the filtered and amplified signal with a signal from a voltage controlled oscillator (VCO) 535. The mixed signal is provided to chipset 530.

On the send path, the chipset 530 outputs a signal to mixer 540. Mixer 540 mixes the signal with a signal from VCO 535. Mixer 540 provides the mixed signal to a power amplifier (PA) 545. The power amplifier 545 amplifies the signal and provides the amplified signal to filter 550. Filter 550 then filters the signal and provides the filtered signal to switch 510 for transmission via an attached antenna. It should be noted that in other embodiments, the filters 515, 550 can be disposed on the other side of the switch 510.

Figure 6:
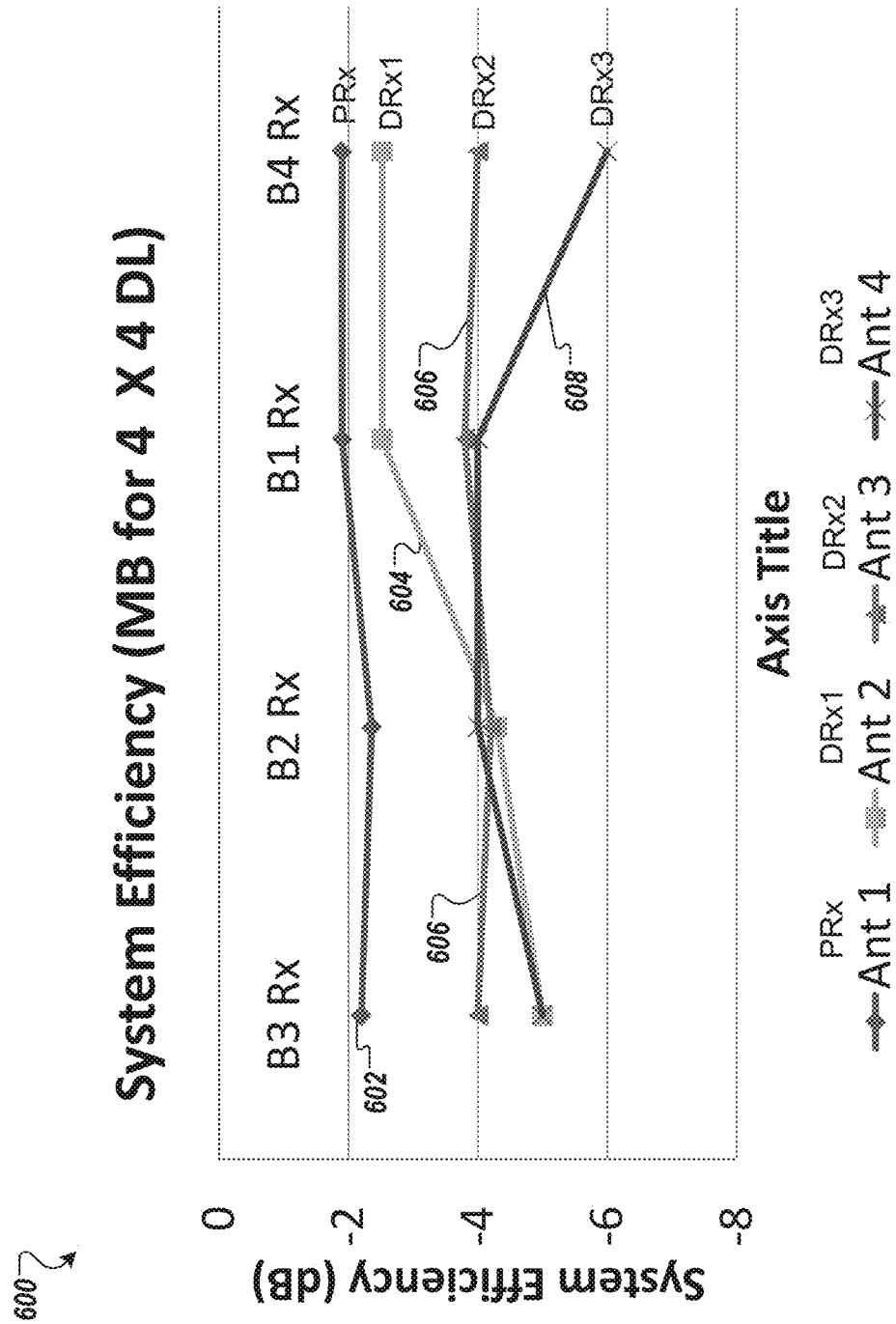
FIG. 6 is a graph of system efficiency of the user device of FIG. 2 for 4×4 DL MIMO antennas for the mid-band (MB) according to one embodiment.

FIG. 6 is a graph 600 of system efficiency of the user device of FIG. 2 for 4×4 DL MIMO antennas for the mid-band (MB) according to one embodiment. The graph 600 illustrates efficiency 602 of the first antenna 202, efficiency 604 of the second antenna 204, efficiency 606 of the third antenna 206 and efficiency 608 of the fourth antenna 208 over a MB frequency range (e.g., 1700 MHz to 2200 MHz). The MB frequency range covers bands B3 Rx, B2 Rx, B1 Rx, and B4 Rx. The total efficiency of the user device can be measured by including the loss of the structure (e.g., due to mismatch loss), dielectric loss, and radiation loss. The graph 600 illustrates that the antennas 202-208 are viable antennas for the relevant frequency range (e.g., MB frequency range) in order to support 4×4 DL MIMO in MB. The efficiency of the respective antenna can be tuned for specified target bands in the MB. The efficiency of the respective antenna may be modified by adjusting dimensions of the 3D structure, the gaps between the elements of the antenna structure, or any combination thereof. Similarly, 2D structures can be modified in dimensions and gaps between elements to improve the efficiency in certain frequency bands.

Figure 7:
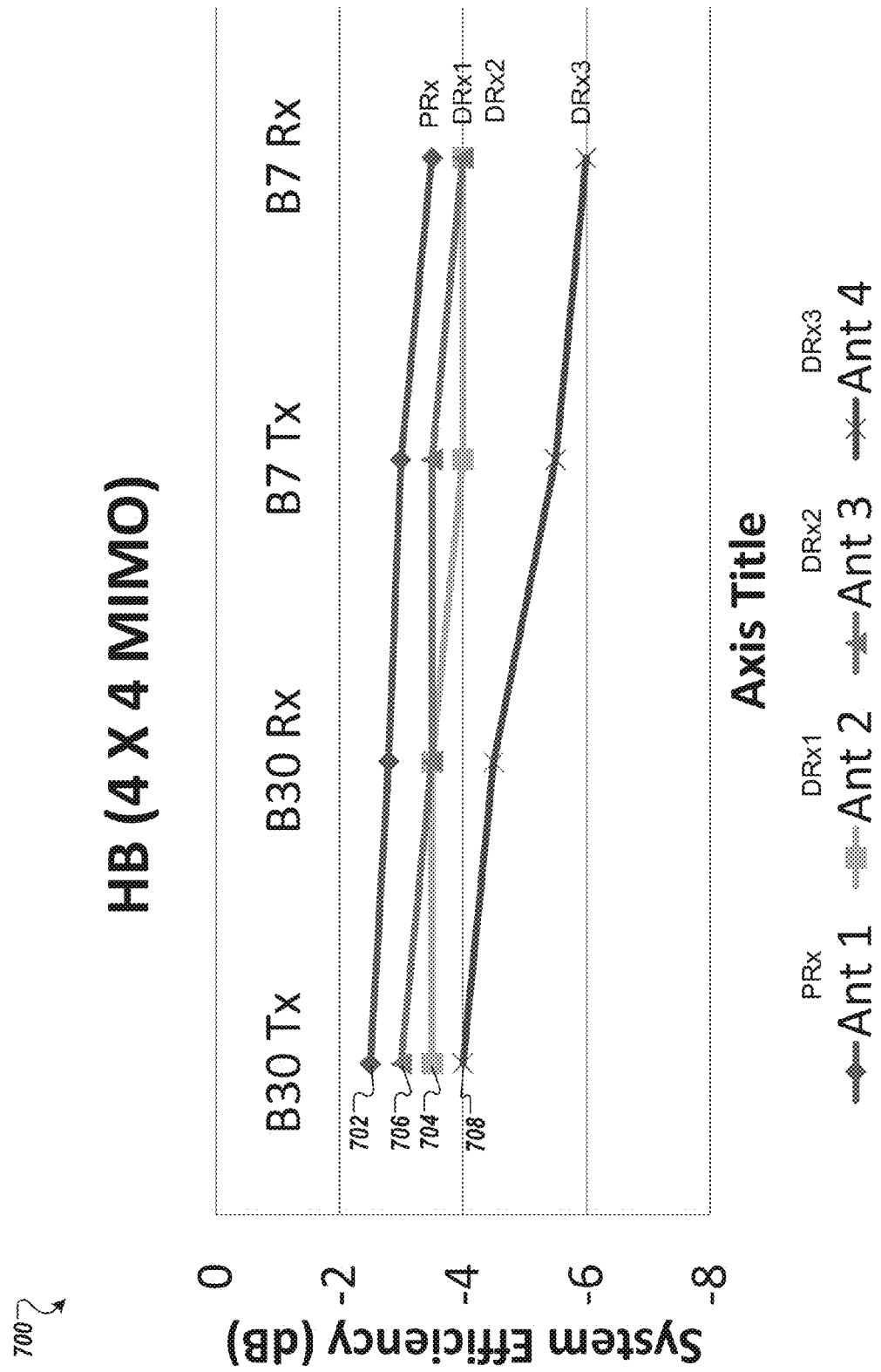
FIG. 7 is a graph of system efficiency of the user device of FIG. 2 for 4×4 DL MIMO antennas for the high-band (HB) according to one embodiment.

FIG. 7 is a graph 700 of system efficiency of the user device of FIG. 2 for 4×4 DL MIMO antennas for the high-band (HB) according to one embodiment. The graph 700 illustrates efficiency 702 of the first antenna 202, efficiency 704 of the second antenna 204, efficiency 706 of the third antenna 206 and efficiency 708 of the fourth antenna 208 over a HB frequency range (e.g., 2300 MHz to 2690 MHz). The HB frequency range covers bands B30 Tx, B30 Rx, B7 Tx, B7 Rx. The graph 700 illustrates that the antennas 202-208 are viable antennas for the relevant frequency range (e.g., HB frequency range) in order to support 4×4 DL MIMO in HB. The efficiency of the respective antenna can be tuned for specified target bands in the HB as described above.

Figure 8:
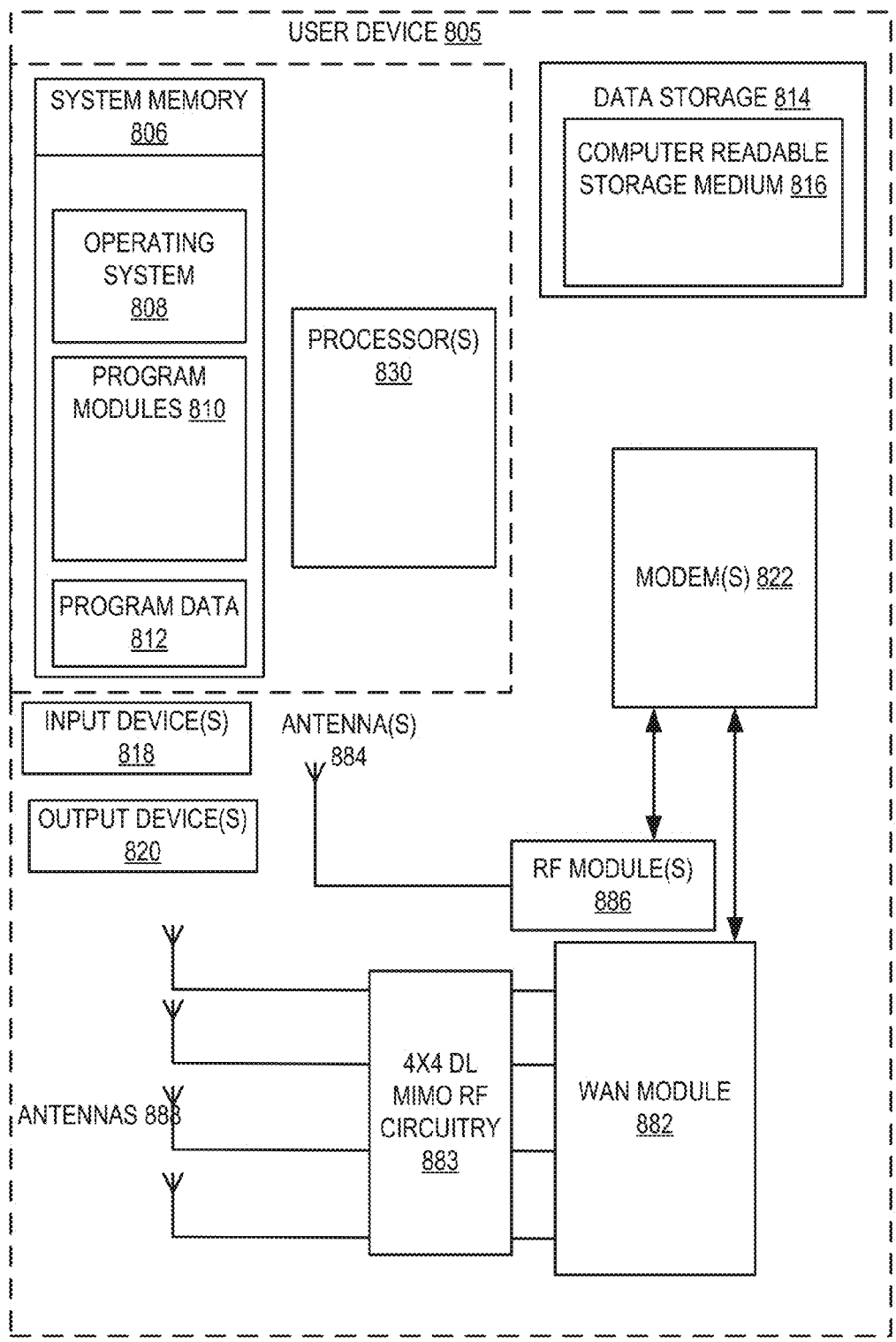
FIG. 8 is a block diagram of a user device in which embodiments of a four-antenna architecture with MIMO RF circuitry for 4×4 DL MIMO support may be implemented.

FIG. 8 is a block diagram of a user device 805 in which embodiments of a four-antenna architecture with MIMO RF circuitry 883 for 4×4 DL MIMO support may be implemented. The user device 805 may correspond to the user device 200 of FIG. 2 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 805 may be any portable or stationary user device. For example, the user device 805 may be an intelligent voice control and speaker system. Alternatively, the user device 805 can be any other device used in a WLAN network (e.g., Wi-Fi® network), a WAN network, or the like.

The user device 805 includes one or more processor(s) 830, such as one or more CPUs, microcontrollers, field programmable gate arrays, or other types of processors. The user device 805 also includes system memory 806, which may correspond to any combination of volatile and/or non-volatile storage mechanisms. The system memory 806 stores information that provides operating system component 808, various program modules 810, program data 812, and/or other components. The user device 805 performs functions by using the processor(s) 830 to execute instructions provided by the system memory 806.

The user device 805 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the user device 805, the system memory 806 and the processor(s) 830 also constituting computer-readable media. The user device 805 may also include one or more input devices 818 (keyboard, mouse device, specialized selection keys, etc.) and one or more output devices 820 (displays, printers, audio output mechanisms, etc.).

The user device 805 further includes a modem 822 to allow the user device 805 to communicate via a wireless network (e.g., such as provided by the wireless communication system) with other computing devices, such as remote computers, an item providing system, and so forth. The modem 822 can be connected a WAN module 882 and zero or more RF modules 886. The WAN module 882 may be the WAN module 340 described herein. Antennas 888 are coupled to the MIMO RF circuitry 883, which is coupled to the WAN module 882. The MIMO RF circuitry 883 may be the diplexers and switches described herein with respect to FIG. 3 and FIG. 4. The MIMO RF circuitry 883 permit the antennas 888 to support 4×4 MIMO functionality in various frequency ranges, such as in the MB frequency range or in HB frequency range, as described above with respect to FIG. 3 and FIG. 4. Zero or more antennas 884 can be coupled to one or more RF modules 886, which is also connected to the modem 822. The zero or more antennas 884 may be GPS antennas, NFC antennas, other WAN antennas, WLAN or PAN antennas, or the like. The modem 822 allows the user device 805 to handle both voice and non-voice communications (such as communications for text messages, multimedia messages, media downloads, web browsing, etc.) with a wireless communication system. The modem 822 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 822 may generate signals and send these signals to antenna 800, 888, and 884 via WAN module 882, and RF module(s) 886 as descried herein. User device 805 may additionally include a WLAN module, a GPS receiver, a PAN transceiver and/or other RF modules. These RF modules may additionally or alternatively be connected to one or more of antennas 884, 888. Antennas 884, 888 may be configured to transmit in different frequency bands and/or using different wireless communication protocols. The antennas 884, 888 may be directional, omnidirectional, or non-directional antennas. In addition to sending data, antennas 884, 888 may also receive data, which is sent to appropriate RF modules connected to the antennas.

In one embodiment, the user device 805 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 822 is shown to control transmission and reception via antenna structures (884, 888), the user device 805 may alternatively include multiple modems, each of which is configured to transmit/receive data via a different antenna and/or wireless transmission protocol.

The user device 805 delivers and/or receives items, upgrades, and/or other information via the network. For example, the user device 805 may download or receive items from an item providing system. The item providing system receives various requests, instructions and other data from the user device 805 via the network. The item providing system may include one or more machines (e.g., one or more server computer systems, routers, gateways, etc.) that have processing and storage capabilities to provide the above functionality. Communication between the item providing system and the user device 805 may be enabled via any communication infrastructure. One example of such an infrastructure includes a combination of a wide area network (WAN) and wireless infrastructure, which allows a user to use the user device 1005 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 805.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 805 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 805 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus comprising:
   an antenna structure comprising four antenna elements; a radio frequency (RF) circuit; and
   a multi-input-multiple-output (MIMO) RF circuit coupled between the antenna structure and the RF circuit,
   wherein the RF circuit is operable to:
   cause a first antenna element of the four antenna elements to radiate and receive electromagnetic energy in a first frequency range via the MIMO RF circuit,
   cause a remaining three antenna elements of the four antenna elements to receive electromagnetic energy in the first frequency range via the MIMO RF circuit to support four-by-four downlink MIMO (4×4 DL MIMO), wherein the first antenna element and the remaining three antenna elements operate concurrently in the first frequency range in the 4×4 DL MIMO, and
   cause a second antenna element of the four antenna elements to radiate and receive electromagnetic energy in a second frequency range via the MIMO RF circuit, wherein the MIMO RF circuitry further comprises:
   a first diplexer;
   a second diplexer;
   a first switch;
   a second switch;
   a first single-pole-multiple-throw (SPnT) switch coupled between the first diplexer and the RF circuit;
   a second SPnT switch coupled to the first switch;
   a third SPnT switch coupled between the second diplexer and the RF circuit;
   a fourth SPnT switch coupled to the second switch;
   a fifth SPnT switch coupled between a third antenna element and the RF circuit; and
   a sixth SPnT switch coupled between a fourth antenna element and the RF circuit.

2. The apparatus of claim 1, wherein the RF circuit is operable to cause the third antenna element of the four antenna elements to radiate and receive electromagnetic energy in a third frequency range via the MIMO RF circuit, and wherein the RF circuit is operable to cause the fourth antenna element of the four antenna elements to radiate and receive electromagnetic energy in a fourth frequency range via the MIMO RF circuit.

3. The apparatus of claim 1, wherein the MIMO RF circuit further comprises:
   the first diplexer coupled to the first antenna element, a first conductive path and a second conductive path, wherein the first conductive path is coupled to the RF circuit;
   the first switch coupled to the second conductive path, a third conductive path and a fourth conductive path, wherein the third conductive path and the fourth conductive path are coupled to the RF circuit;
   the second diplexer coupled to the second antenna element of the four antenna elements, a fifth conductive path and a sixth conductive path, wherein the fifth conductive path is coupled to the RF circuit; and
   the second switch coupled to the sixth conductive path, a seventh conductive path and an eighth conductive path, wherein the seventh conductive path and the eighth conductive path are coupled to the RF circuit,
   wherein a ninth conductive path is coupled between the third antenna element of the four antenna elements and the RF circuit, and
   wherein a tenth conductive path is coupled between the fourth antenna element of the four antenna elements and the RF circuit.

4. The apparatus of claim 3, wherein the RF circuit is operable to cause:
   the first antenna element to radiate and receive electromagnetic energy in one of: the first frequency range, the second frequency range, or a third frequency range, the first antenna element operating as a first receive antenna of the 4×4 DL MIMO in the first frequency range,
   the second antenna element to receive electromagnetic energy in at least one of the first frequency range, the second frequency range, or the third frequency range, the second antenna element operating as a second receive antenna of the 4×4 DL MIMO in the first frequency range, the third antenna element to receive electromagnetic energy as a third receive antenna of the 4×4 DL MIMO in the first frequency range, and the fourth antenna element to receive electromagnetic energy as a fourth receive antenna of the 4×4 DL MIMO in the first frequency range, and wherein the first frequency range is between approximately 2300 MHz to 2690 MHz.

5. The apparatus of claim 1, further comprising:
a first plurality of band pass filters coupled to outputs of the second SPnT;
a second plurality of band pass filters coupled to outputs of the fourth SPnT;
a third plurality of band pass filters coupled to outputs of the fifth SPnT; and
a fourth plurality of band pass filters coupled to outputs of the sixth SPnT.

6. The apparatus of claim 1, wherein the MIMO RF circuit further comprises:
the first diplexer coupled to the first antenna element, a first conductive path and a second conductive path, wherein the first conductive path and the second conductive path are coupled to the RF circuit;
the second diplexer coupled to the second antenna element of the four antenna elements, a third conductive path and a fourth conductive path, wherein the third conductive path and the fourth conductive path are coupled to the RF circuit; and
the first switch coupled to the third antenna element of the four antenna elements, a fifth conductive path and a sixth conductive path, wherein the fifth conductive path and the sixth conductive path are coupled to the RF circuit; and
the second switch coupled to the fourth antenna element of the four antenna elements, a seventh conductive path and an eighth conductive path, wherein the seventh conductive path and the eighth conductive path are coupled to the RF circuit.

7. The apparatus of claim 6, wherein the RF circuit is operable to cause:
the first antenna element to radiate and receive electromagnetic energy in at least one of the first frequency range or the second frequency range, the first antenna element operating as a first receive antenna of the 4×4 DL MIMO in the first frequency range,
the second antenna element to receive electromagnetic energy in at least one of the first frequency range or the second frequency range, the second antenna element operating as a second receive antenna of the 4×4 DL MIMO in the first frequency range,
the third antenna element to receive electromagnetic energy as a third receive antenna of the 4×4 DL MIMO in the first frequency range, and
the fourth antenna element to receive electromagnetic energy as a fourth receive antenna of the 4×4 DL MIMO in the first frequency range.

8. The apparatus of claim 6, wherein the first frequency range is between approximately 1700 MHz to 2170 MHz.

9. An apparatus comprising:
an antenna structure comprising four antenna elements;
a radio frequency (RF) circuit; and
a multi-input-multiple-output (MIMO) RF circuit coupled between the antenna structure and the RF circuit, wherein the MIMO RF circuitry further comprises:
a first diplexer coupled to the first antenna element, a first conductive path and a second conductive path, wherein the first conductive path and the second conductive path are coupled to the RF circuit;
a second diplexer coupled to a second antenna element of the four antenna elements, a third conductive path and a fourth conductive path, wherein the third conductive path and the fourth conductive path are coupled to the RF circuit; and
a first switch coupled to a third antenna element of the four antenna elements, a fifth conductive path and a sixth conductive path, wherein the fifth conductive path and the sixth conductive path are coupled to the RF circuit;
a second switch coupled to a fourth antenna element of the four antenna elements, a seventh conductive path and an eighth conductive path, wherein the seventh conductive path and the eighth conductive path are coupled to the RF circuit;
a first single-pole-multiple-throw (SPnT) switch coupled between the first diplexer and the RF circuit;
a second SPnT switch coupled between the first diplexer and the RF circuit;
a third SPnT switch coupled between the first switch and the RF circuit;
a fourth SPnT switch coupled between the second diplexer and the RF circuit;
a fifth SPnT switch coupled between the second diplexer and the RF circuit; and
a sixth SPnT switch coupled between the second switch and the RF circuit.

10. The apparatus of claim 9, further comprising:
a first plurality of band pass filters coupled to outputs of the second SPnT;
a second plurality of band pass filters coupled to outputs of the third SPnT;
a third plurality of band pass filters coupled to outputs of the fifth SPnT; and
a fourth plurality of band pass filters coupled to outputs of the sixth SPnT.

11. An electronic device comprising:
a first antenna, a second antenna, a third antenna and a fourth antenna;
a printed circuit board comprising a wireless area network (WAN) module;
multiple-input-multiple-output (MIMO) radio frequency (RF) circuitry coupled to the WAN module, the first antenna, the second antenna, the third antenna and the fourth antenna, wherein the MIMO RF circuitry comprises:
a first diplexer coupled to the first antenna;
a second diplexer coupled to the second antenna;
a first switch coupled between the third antenna and the WAN module; and
a second switch coupled between the fourth antenna and the WAN module, wherein the WAN module is operable to cause:
the first antenna to radiate or receive electromagnetic energy in a first frequency range via a first path through the first diplexer,
the first antenna to radiate or receive electromagnetic energy in a second frequency range via a second path through the first diplexer,
the second antenna to receive electromagnetic energy in the first frequency range via a third path through the second diplexer,
the second antenna to receive electromagnetic energy in the second frequency range via a fourth path through the second diplexer, the third antenna to receive electromagnetic energy in the second frequency range via a fifth path through the first switch, and the fourth antenna to receive electromagnetic energy in the second frequency range via a sixth path through the second switch, and wherein the WAN module is operable to cause the first antenna, the second antenna, the third antenna, and the fourth antenna to concurrently receive electromagnetic energy in the first frequency range in a four-by-four downlink MIMO (4×4 DL MIMO) configuration.

12. The electronic device of claim 11, wherein the WAN module is further operable to cause:

the third antenna to receive electromagnetic energy in a third frequency range via a seventh path through the first switch in a second configuration, and the fourth antenna to receive electromagnetic energy in a fourth frequency range via an eighth path through the second switch in the second configuration.

13. The electronic device of claim 12, wherein the first frequency range is between approximately 690 MHz to approximately 960 MHz, wherein the second frequency range is between approximately 1700 MHz to 2170 MHz, and wherein the third frequency range is between approximately 2300 MHz to 2690 MHz.

14. The electronic device of claim 11, wherein the MIMO RF circuitry further comprises:

a first single-pole-multiple-throw (SPnT) switch coupled between the first diplexer and the WAN module;

a second SPnT switch coupled between the first diplexer and the WAN module;

a third SPnT switch coupled between the first switch and the WAN module;

a fourth SPnT switch coupled between the second diplexer and the WAN module;

a fifth SPnT switch coupled between the second diplexer and the WAN module; and a sixth SPnT switch coupled between the second switch and the WAN module.

15. The electronic device of claim 11, further comprising:

a first plurality of band pass filters coupled to outputs of the second SPnT;

a second plurality of band pass filters coupled to outputs of the third SPnT;

a third plurality of band pass filters coupled to outputs of the fifth SPnT; and a fourth plurality of band pass filters coupled to outputs of the sixth SPnT.

16. An electronic device comprising:

a first antenna, a second antenna, a third antenna and a fourth antenna;

a printed circuit board comprising a wireless area network (WAN) module;

multiple-input-multiple-output (MIMO) radio frequency (RF) circuitry coupled to the WAN module, the first antenna, the second antenna, the third antenna and the fourth antenna, wherein the MIMO RF circuitry comprises:

a first diplexer coupled to the first antenna;

a first switch;

a second diplexer coupled to the second antenna; and a second switch, and wherein the WAN module is operable to:

cause the first antenna to radiate and receive electromagnetic energy in a first frequency range when the MIMO RF circuitry is in a four-by-four downlink MIMO (4×4 DL MIMO) configuration, cause the second antenna, the third antenna, and the fourth antenna to receive electromagnetic energy in the first frequency range when the MIMO RF circuitry is in the 4×4 DL MIMO configuration, wherein the first antenna, the second antenna, the third antenna, and the fourth antenna operate concurrently in the first frequency range in the 4×4 DL MIMO, and cause the second antenna to radiate and receive electromagnetic energy in a second frequency range when the MIMO RF circuitry is in a second configuration.

17. The electronic device of claim 16, wherein the first switch is coupled between the first diplexer and the WAN module and the second switch is coupled between the second diplexer and the WAN module.

18. The electronic device of claim 17, wherein the MIMO RF circuitry further comprises:

a first single-pole-multiple-throw (SPnT) switch coupled between the first diplexer and the WAN module;

a second SPnT switch coupled between the first switch and the WAN module;

a third SPnT switch couple between the second diplexer and the WAN module;

a fourth SPnT switch coupled between the second switch and the WAN module;

a fifth SPnT switch coupled between the third antenna and the WAN module; and a sixth SPnT switch coupled between the fourth antenna and the WAN module.

19. The electronic device of claim 18, wherein the WAN module is operable to cause:

the first antenna to radiate or receive electromagnetic energy in the first frequency range via a first path through the first diplexer, the first antenna to radiate or receive electromagnetic energy in the second frequency range via a second path through the first switch and the first diplexer, the first antenna to radiate or receive electromagnetic energy in a third frequency range via a third path through the first switch and the first diplexer, the second antenna to receive electromagnetic energy in the first frequency range via a fourth path through the second diplexer, the second antenna to receive electromagnetic energy in the second frequency range via a fifth path through the second switch and the second diplexer, the second antenna to receive electromagnetic energy in the third frequency range via a sixth path through the second switch and the second diplexer, the third antenna to receive electromagnetic energy in the second frequency range via a seventh path between the third antenna and the WAN module, and the fourth antenna to receive electromagnetic energy in the second frequency range via an eighth path between the fourth antenna and the WAN module.

20. The electronic device of claim 19, further comprising:

a first plurality of band pass filters coupled to outputs of the second SPnT;

a second plurality of band pass filters coupled to outputs of the fourth SPnT;

a third plurality of band pass filters coupled to outputs of the fifth SPnT; and a fourth plurality of band pass filters coupled to outputs of the sixth SPnT.

21. The electronic device of claim 16, wherein the first switch is coupled between the third antenna and the WAN module and the second switch is coupled between the fourth antenna and the WAN module.

22. The electronic device of claim 21, wherein the MIMO RF circuitry further comprises:
   a first single-pole-multiple-throw (SPnT) switch coupled between the first diplexer and the WAN module;
   a second SPnT switch coupled between the first diplexer and the WAN module;
   a third SPnT switch couple between the second diplexer and the WAN module;
   a fourth SPnT switch coupled between the second diplexer and the WAN module;
   a fifth SPnT switch coupled between the first t switch and the WAN module; and
   a sixth SPnT switch coupled between the second switch and the WAN module.

* * * * *